(12) United States Patent
Mavroudis et al.

(10) Patent No.: US 11,534,718 B2
(45) Date of Patent: Dec. 27, 2022

(54) POLYGONAL SUBSTRATE HOUSINGS AND ASSEMBLIES

(71) Applicant: CUMMINS EMISSION SOLUTIONS INC., Columbus, IN (US)

(72) Inventors: George E. Mavroudis, Oregon, WI (US); Taren Dehart, Columbus, IN (US); Daniel W. Woods, Columbia City, IN (US); Ryan M. Johnson, Cottage Grove, WI (US); Colin L. Norris, Columbus, IN (US); Randolph G. Zoran, McFarland, WI (US)

(73) Assignee: Cummins Emission Solutions Inc., Columbus, IN (US)

( * ) Notice: Subject to any disclaimer, the term of this patent is extended or adjusted under 35 U.S.C. 154(b) by 98 days.

(21) Appl. No.: 16/318,962

(22) PCT Filed: Jul. 20, 2017

(86) PCT No.: PCT/US2017/043101
§ 371 (c)(1),
(2) Date: Jan. 18, 2019

(87) PCT Pub. No.: WO2018/017848
PCT Pub. Date: Jan. 25, 2018

(65) Prior Publication Data
US 2019/0240619 A1    Aug. 8, 2019

Related U.S. Application Data

(60) Provisional application No. 62/365,198, filed on Jul. 21, 2016.

(51) Int. Cl.
*B01D 53/88*    (2006.01)
*B01D 53/94*    (2006.01)
(Continued)

(52) U.S. Cl.
CPC ....... *B01D 53/885* (2013.01); *B01D 53/9431* (2013.01); *B01J 35/02* (2013.01);
(Continued)

(58) Field of Classification Search
CPC .................. B01D 53/88; B01D 53/885; B01D 53/9409; B01D 53/944; F01N 3/2066;
(Continued)

(56) References Cited

U.S. PATENT DOCUMENTS 3,912,459 A    10/1975 Kearsley
4,976,929 A    12/1990 Cornelison et al.
(Continued)

FOREIGN PATENT DOCUMENTS

DE    38 35 541    11/1989
FR    2915235    10/2008

OTHER PUBLICATIONS

International Search Report and Written Opinion from corresponding PCT Application No. PCT/US2017/043101, dated Oct. 13, 2017, pp. 1-10.

*Primary Examiner* — Maria V Ewald
*Assistant Examiner* — Daniel P Dillon
(74) *Attorney, Agent, or Firm* — Foley & Lardner LLP

(57) ABSTRACT

A polygonal substrate assembly includes a polygonal substrate housing, a substrate, and a compressible mat. The compressible mat is positioned about the substrate and the substrate is press-fit within the polygonal substrate housing with the compressible mat. The polygonal substrate housing may include a sidewall having a concave portion. The polygonal substrate housing may include a substrate installation portion that flares out from a main sidewall at an end of the polygonal substrate housing. The polygonal substrate housing may be formed from a plurality of substrate housing components welded together. The polygonal substrate hous-
(Continued)

ing can include one or more stiffening ribs. Several polygonal substrate assemblies may be combined and coupled together to form an array in various geometric configurations.

19 Claims, 8 Drawing Sheets

(51) Int. Cl.
  *B01J 35/02* (2006.01)
  *F01N 3/28* (2006.01)
  *F01N 3/20* (2006.01)
(52) U.S. Cl.
  CPC .............. *F01N 3/28* (2013.01); *F01N 3/2853* (2013.01); *B01D 53/88* (2013.01); *F01N 3/2066* (2013.01)
(58) Field of Classification Search
  CPC ........... F01N 3/2853; F01N 3/28–2896; F01N 2450/02; F01N 13/1838; F01N 2450/18; F01N 2450/30; F01N 3/2857; C04B 38/0016; B23K 2101/18
  See application file for complete search history.

(56) References Cited

U.S. PATENT DOCUMENTS

| | | | |
|---|---|---|---|
| 6,099,809 A | 8/2000 | Foster et al. | |
| 6,824,744 B1* | 11/2004 | Stoepler | F01N 3/2857 422/177 |
| 6,878,351 B1 | 4/2005 | Davies | |
| 7,179,431 B2* | 2/2007 | Lesher | B01D 53/885 422/219 |
| 8,475,721 B2 | 7/2013 | Okabe | |
| 8,795,598 B2 | 8/2014 | Lawrukovich | |
| 9,086,007 B2 | 7/2015 | Baig et al. | |
| 2002/0071791 A1* | 6/2002 | Foster | F01N 3/2857 422/179 |
| 2006/0156794 A1 | 7/2006 | Horn et al. | |
| 2008/0196248 A1* | 8/2008 | Forster | F01N 13/18 72/367.1 |
| 2011/0030355 A1 | 2/2011 | Gilmer et al. | |
| 2011/0185576 A1* | 8/2011 | Keller | B23P 17/00 29/700 |
| 2012/0269993 A1* | 10/2012 | Weeks | B32B 5/022 156/332 |
| 2014/0175238 A1* | 6/2014 | Roozenboom | F01N 13/1838 248/201 |
| 2015/0238898 A1 | 8/2015 | Kleuderlein et al. | |
| 2017/0159529 A1* | 6/2017 | Kleuderlein | F01N 3/2842 |

* cited by examiner

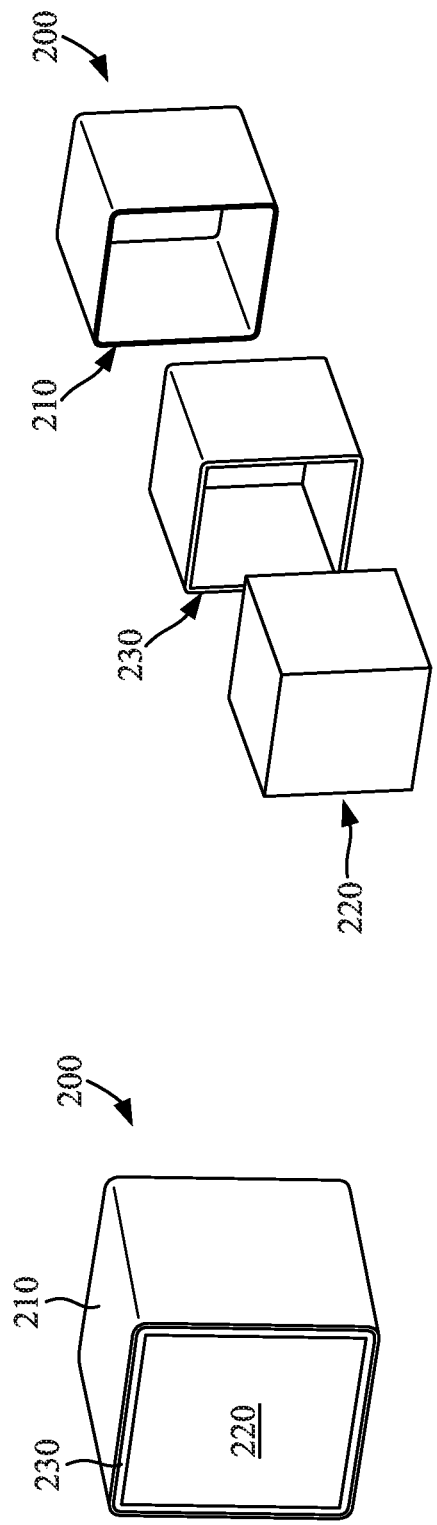
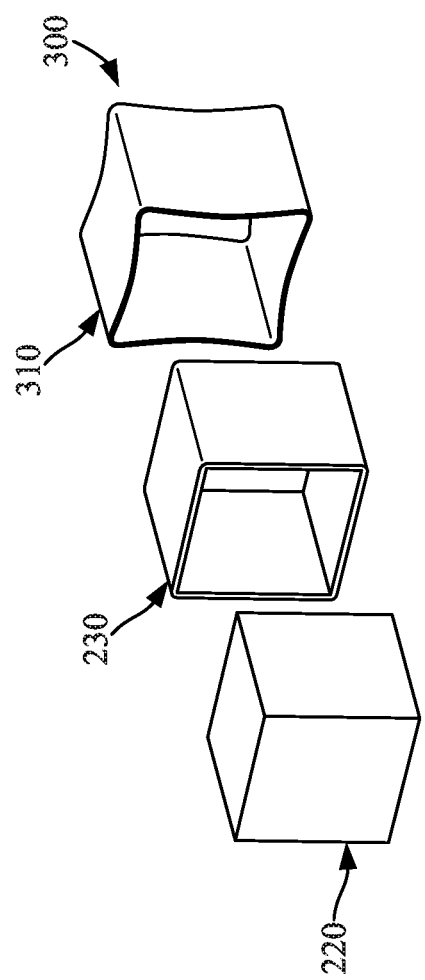

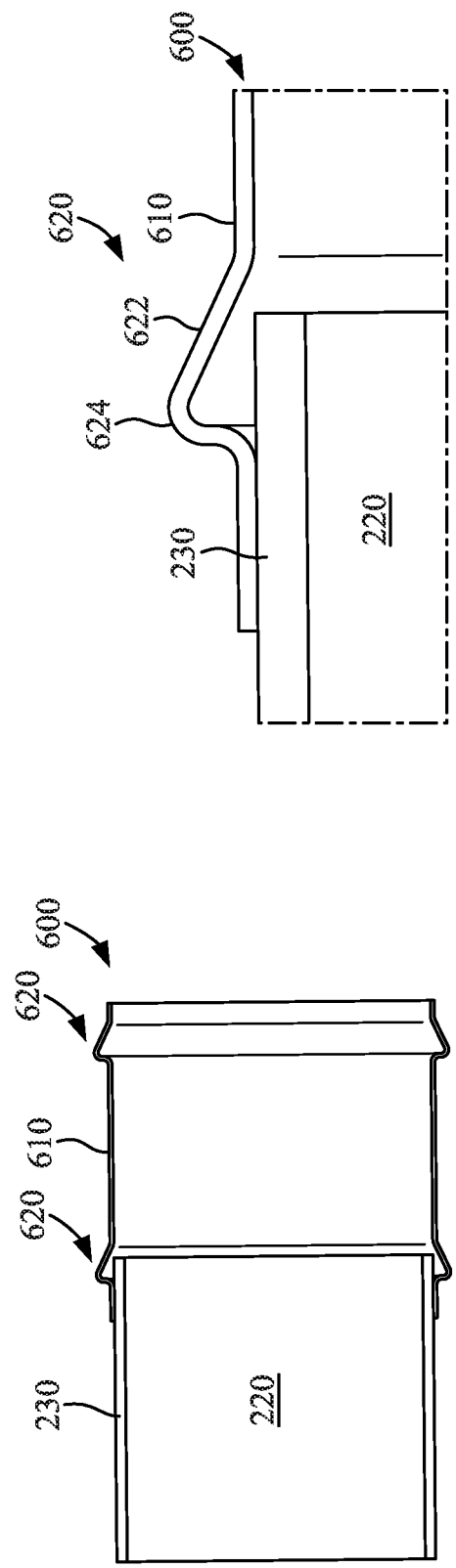
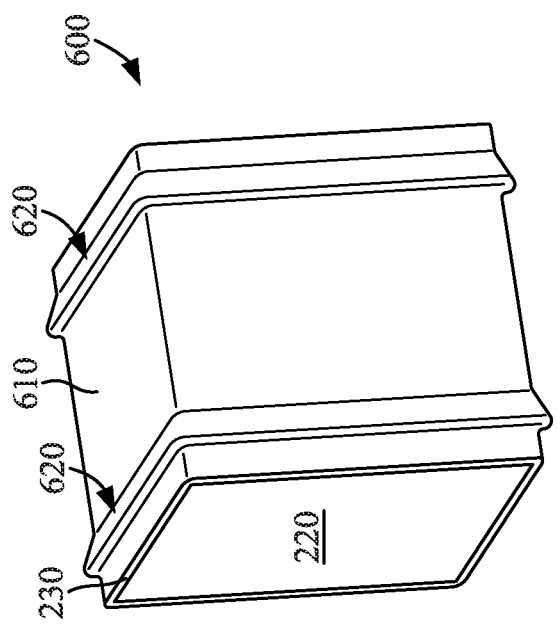

POLYGONAL SUBSTRATE HOUSINGS AND ASSEMBLIES

CROSS-REFERENCE TO RELATED APPLICATION

The present application is the U.S. national phase of PCT International Application No. PCT/US2017/043101, filed Jul. 20, 2017, which claims priority to U.S. Provisional Appl. No. 62/365,198, filed on Jul. 21, 2016, which are hereby incorporated by reference in their entireties.

TECHNICAL FIELD

The present application relates generally to the field of aftertreatment systems for internal combustion engines.

BACKGROUND

For internal combustion engines, such as diesel engines, nitrogen oxide ($NO_x$) compounds may be emitted in the exhaust. To reduce $NO_x$ emissions, a SCR process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant, such as anhydrous ammonia or urea, is typically introduced into the exhaust gas flow prior to the catalyst chamber. To introduce the reductant into the exhaust gas flow for the SCR process, an SCR system may dose or otherwise introduce the reductant through a dosing module that vaporizes or sprays the reductant into an exhaust pipe of the exhaust system up-stream of the catalyst chamber. The SCR system may include one or more sensors to monitor conditions within the exhaust system.

SCR systems typically utilize a substrate coated with catalyst material that is placed in the exhaust stream such that all of the exhaust gas is forced through the substrate, thereby exposing the exhaust gas to the catalyst material and converting the $NO_x$ compounds into more neutral compounds. Cylindrical substrates have been typically used for such systems because they can be press fit into cylindrical housings with minimum difficulty. However, the cylindrical shape has a drawback in terms of packaging density. The useful cross sectional area of a cylindrical substrate is equal to 0.78544 where d is the diameter. Thus, for cross-section area taken up by the cylindrical substrate, approximately 21% of the area is not utilized based on the cylindrical shape.

SUMMARY

Implementations described herein relate to polygonal substrate housings and assemblies.

One implementation relates to a polygonal substrate assembly that includes a polygonal substrate housing, a substrate, and a compressible mat. The compressible mat is positioned about the substrate and the substrate is press-fit within the housing with the compressible mat. The polygonal substrate housing may include a sidewall having a concave portion. The polygonal substrate housing may include a substrate installation portion that flares out from a main sidewall at an end of the polygonal substrate housing. The polygonal substrate housing may be formed from a plurality of substrate housing components welded together. The polygonal substrate housing can include one or more stiffening ribs. In some implementations, several polygonal substrate assemblies can be combined and coupled together to form an array in various geometric configurations.

Another implementation relates to an assembly that includes a plurality of polygonal substrate assemblies. Each of the plurality of polygonal substrate assemblies includes a polygonal substrate housing, a substrate, and a compressible mat. The compressible mat is positioned about the substrate, and the substrate is press-fit within the polygonal housing with the compressible mat. The plurality of polygonal substrate assemblies are coupled together to form an array.

Another implementation relates to an assembly that includes a canning assembly that forms a polygonal arrangement and several substrate assemblies. The substrate assemblies include a substrate and a compressible mat. The mat is positioned about the substrate. The several substrate assemblies are press-fit within the canning assembly. In some implementations, the canning assembly includes a first end cap, a second end cap, and a plurality of interior partitions. A thickness of an interior partition of the plurality of interior partitions can be less than a thickness of one of the first end cap and second end cap. The polygonal arrangement can be a rectangular grid arrangement.

BRIEF DESCRIPTION

The details of one or more implementations are set forth in the accompanying drawings and the description below. Other features, aspects, and advantages of the disclosure will become apparent from the description, the drawings, and the claims, in which:

FIG. 2 is a perspective view of a rectangular substrate housing with a substrate and compressible mat;

FIG. 3 is a perspective exploded view of the rectangular substrate housing with the substrate and compressible mat exploded out;

FIG. 4 is a perspective exploded view of a rectangular substrate housing having concave walls with the substrate and compressible mat exploded out;

FIG. 7A is a side cross-sectional view of a rectangular substrate housing with a stiffening rib and showing a substrate and compressible mat;

FIG. 7B is a magnified view of the stiffening rib of the rectangular substrate housing of FIG. 7A;

FIG. 7C is a perspective view of the rectangular substrate housing with the stiffening rib of FIG. 7A and showing the substrate and compressible mat inserted;

Figure 1:
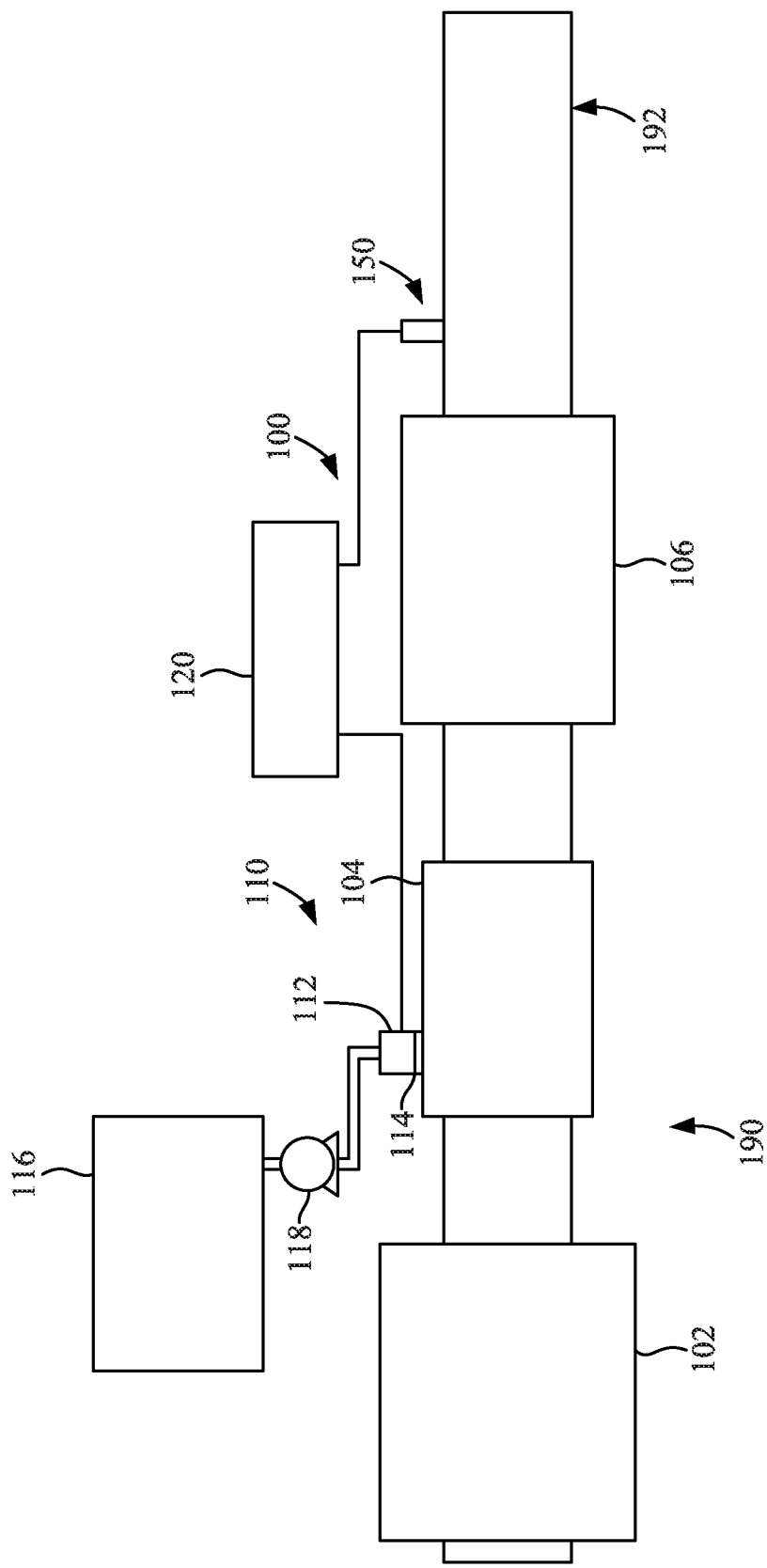
FIG. 1 is a block schematic diagram of an example selective catalytic reduction system having an example reductant delivery system for an exhaust system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for polygonal substrate housings and assemblies. The various concepts introduced above and discussed in greater detail below may be implemented in any of numerous ways, as the described concepts are not limited to any particular manner of implementation. Examples of specific implementations and applications are provided primarily for illustrative purposes.

I. Overview

In some vehicles and/or systems, the dimensions or footprint of the system may be important to sizing constraints, orientations, etc. Thus, providing a compact and efficient use of available space may for an aftertreatment system may reduce the footprint of the system and/or allow for more variety in configurations.

The present disclosure relates to polygonal substrate housings that are designed to accommodate polygonal substrates in various applications, such as an engine exhaust aftertreatment system. The configurations provided herein are viable alternatives to conventional cylindrical substrate housings that can be used to reduce the space occupied by an exhaust system without reducing its capacity. The polygonal substrate housings include varying configurations to maintain even interface pressure over the substrate surface area for the flat walls. Engine exhaust aftertreatment systems typically include a substrate coated with a catalyst material that is secured within a housing to be placed in the exhaust stream such that exhaust gas from the engine is forced through the substrate, exposing the exhaust gas to the catalyst material and reducing emissions.

Cylindrical substrates and housing are typically used in exhaust aftertreatment systems due to the conforming cylindrical shape to exhaust piping and because the cylindrical substrate can be press fit into cylindrical housings and/or a cylindrical housing can be rolled or otherwise formed about the cylindrical substrate with minimum difficulty. However, the cylindrical shaped substrate has a cross sectional area of $0.7854\ d^2$, where d is the diameter. In contrast, a square shaped substrate cross sectional area of $d^2$. Thus, when occupying the same cross-sectional area (i.e., positioned in an area based on the maximum dimension of d), a system utilizing a square or rectangular substrate can have an increased capacity by approximately 21%. In implementations using other polygonal shaped housings and substrates, the increased capacity may be achieved using multiple polygonal substrate assemblies and/or combinations of different polygonal substrate assemblies (e.g., octagonal and square assemblies). Such an increase in cross-sectional area may permit the length of the substrate to be reduced due to the higher percentage of exhaust gas being exposed to the catalyst material on the substrate per unit length.

Although the benefits of the increased cross-sectional area have been known, usage of polygonal cross-section substrates and housings have been limited based on installation and retention technical problems. The present disclosure addresses these technical problems while providing viable alternatives to cylindrical substrates.

Catalyst substrates are typically installed by wrapping a thick sheet of compressible material (referred to as MAT) around a catalyst coated substrate and the wrapped catalyst substrate is press fitted into a housing. For a cylindrical housing, the pressure is evenly distributed over the inside surface area of the cylindrical housing. In contrast, with a polygonal substrate housing, such as a square, the sidewalls will tend to "bow out," resulting in a lack of interface pressure (and lack of substrate retention capability) at the midspan of the bowed out sidewalls. As a result, a press-fitted catalyst substrate may loosen and dislodge from the housing as a result of vibration and exhaust backpressure applied to the catalyst substrate. A lack of interface pressure at the midspan of the sidewalls cannot be compensated for with added interface pressure at the corners. Moreover, due to limited strength characteristics of substrates, the interface pressure should be distributed as evenly as possible over the entire surface area of the substrate. The present disclosure includes a number of different configurations for a polygonal substrate housing, such as a rectangular substrate housing, to evenly distribute the interface pressure over the surface area of the substrate to secure the substrate within the polygonal housing while not damaging the substrate itself. Each configuration described herein can be used alone or in combination with features of the other configurations described herein to satisfy a wide variety of applications. The rectangular substrate housings herein may permit the angular relationship between the sides to vary a few degrees from a 90 degree or perpendicular angle. Additionally, although rectangular substrate housings are described, the implementations may be used for other polygonal substrate housings and/or assemblies, including quadrilateral, pentagonal, hexagonal, octagonal, etc. substrate housings and/or assemblies.

II. Overview of Aftertreatment System

FIG. 1 depicts an aftertreatment system 100 having an example reductant delivery system 110 for an exhaust system 190. The aftertreatment system 100 includes a particulate filter 102 (such as a diesel particulate filter (DPF)), the reductant delivery system 110, a decomposition chamber or reactor 104, a SCR catalyst 106, and a sensor 150.

The particulate filter 102 is configured to remove particulate matter, such as soot, from exhaust gas flowing in the exhaust system 190. The particulate filter 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea, aqueous ammonia, or diesel exhaust fluid (DEF), into ammonia. The decomposition chamber 104 includes a reductant delivery system 110 having a dosing module 112 configured to dose the reductant into the decomposition chamber 104. In some implementations, the reductant is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the particulate filter 102 to receive the exhaust gas containing $NO_x$ emissions and an outlet for the exhaust gas, $NO_x$ emissions, ammonia, and/or remaining reductant to flow to the SCR catalyst 106.

The decomposition chamber 104 includes the dosing module 112 mounted to the decomposition chamber 104 such that the dosing module 112 may dose the reductant into the exhaust gases flowing in the exhaust system 190. The dosing module 112 may include an insulator 114 interposed between a portion of the dosing module 112 and the portion of the decomposition chamber 104 to which the dosing module 112 is mounted. The dosing module 112 is fluidly coupled to one or more reductant sources 116. In some implementations, a pump 118 may be used to pressurize the reductant from the reductant source 116 for delivery to the dosing module 112.

The dosing module 112 and pump 118 are also electrically or communicatively coupled to a controller 120. The controller 120 is configured to control the dosing module 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes inlet in fluid communication with the decomposition chamber 104 from which exhaust gas and reductant is received and an outlet in fluid communication with an end of the exhaust system 190.

The exhaust system 190 may further include a diesel oxidation catalyst (DOC) in fluid communication with the exhaust system 190 (e.g., downstream of the SCR catalyst 106 or upstream of the particulate filter 102) to oxidize hydrocarbons and carbon monoxide in the exhaust gas.

In some implementations, the particulate filter 102 may be positioned downstream of the decomposition chamber or reactor pipe 104. For instance, the particulate filter 102 and the SCR catalyst 106 may be combined into a single unit, such as an SDPF. In some implementations, the dosing module 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190, such as a tip of the sensor 150 may extend into a portion of the exhaust system 190. In other implementations, the sensor 150 may receive exhaust gas through another conduit, such as a sample pipe extending from the exhaust system 190. While the sensor 150 is depicted as positioned downstream of the SCR catalyst 106, it should be understood that the sensor 150 may be positioned at any other position of the exhaust system 190, including upstream of the particulate filter 102, within the particulate filter 102, between the particulate filter 102 and the decomposition chamber 104, within the decomposition chamber 104, between the decomposition chamber 104 and the SCR catalyst 106, within the SCR catalyst 106, or downstream of the SCR catalyst 106. In addition, two or more sensor 150 may be utilized for detecting a condition of the exhaust gas, such as two, three, four, five, or six sensors 150 with each sensor 150 located at one of the foregoing positions of the exhaust system 190.

III. Implementations of Polygonal Substrate Housing

FIGS. 2-3 depict an implementation of a polygonal substrate assembly 200 having a rectangular substrate housing 210, a substrate 220, and a compressible mat 230. The rectangular substrate housing 210 of the implementations of FIGS. 2-3 is a square tube with thick sidewalls (e.g., approximately 3 millimeters (mm) wall thickness). Although the rectangular substrate housing 210 is shown in a square configuration, any rectangular configuration may be used. The sidewall thickness can be useable with any length of rectangular substrate housing 210. In some implementations, the rectangular substrate housing 210 may have a width and height of approximately 150 mm, though any dimensional size for the width and height of the rectangular substrate housing 210 can be used.

The substrate 220 may be any substrate suitable for coating catalyst material thereon, such as a ceramic substrate, a metallic substrate, etc. The substrate 220 includes a catalyst washcoat applied thereon. The compressible mat 230 comprise any suitable for thermal insulation of the substrate 220 and securing the substrate 220 within the rectangular substrate housing 210. In some implementations, the compressible mat 230 may be formed of ceramic fibers or compound materials. In some implementations, the compressible mat 230 may be an intumescent material.

In the implementation shown in FIGS. 2-3, the substrate 220 comprises a catalytic material applied to one or more surfaces of the substrate 220. The application of the catalytic material may be from applying a washcoat to the substrate 220. The compressible mat 230 is then positioned about the substrate 220. In some implementations, the compressible mat 230 is wrapped around the substrate 220. In other implementations, the substrate 220 is inserted into a preformed compressible mat 230. In some implementations, the thickness of the compressible mat 230 is based on a desired gap bulk density for the polygonal substrate assembly 200. The substrate 220 with the compressible mat 230 positioned about the substrate 220 is then pressed through a square stuffing funnel (not shown) into the rectangular substrate housing 210. In some implementations, a square stuffing plunger with retractable tabs may be used to push the compressible mat 230 along with the substrate 220 into the rectangular substrate housing 210. When the compressible mat 230 and the substrate 220 are inserted into the rectangular substrate housing 210, as shown in FIG. 2, the compressible mat 230 is compressed between the interior surface of the sidewalls and corners of the rectangular substrate housing 210 and the exterior surface of the substrate 220. Thus, the compressible mat 230 is compressed to the desired gap bulk density for the polygonal substrate assembly 200 and also provides an interference fit between the rectangular substrate housing 210 and the substrate 220, thereby securing the substrate 220 within the rectangular substrate housing 210.

In the implementation shown, the sidewalls of the rectangular substrate housing 210 have a 3 mm thickness relative to the 150 mm sidewall width and height. The ratio of the sidewall thickness to the sidewall width/height avoids excessive deflection of the midspan point of the sidewall of the rectangular substrate housing 210, thereby maintaining interface pressure with the substrate 220. In some implementations, the sidewall thickness may be based on the width or height dimension of the rectangular substrate housing 210 and a desired gap bulk density and/or interface pressure. In other implementations, the width or height dimension of the rectangular substrate housing 210 may be based on the sidewall thickness and a desired gap bulk density and/or interface pressure. Although rectangular substrate housings are described, the implementations may be used for other polygonal substrate housings and/or assemblies, including quadrilateral, pentagonal, hexagonal, octagonal, etc. substrate housings and/or assemblies.

FIG. 4 depicts another implementation of a polygonal substrate assembly 300 having a rectangular substrate housing 310, the substrate 220, and the compressible mat 230. In this implementation, the rectangular substrate housing 310 has concave sidewalls, which allows for a thinner sidewall thickness (e.g., 1-2 mm) that expand and straighten due to the sidewall interface pressure when the compressible mat 230 and substrate 220 are inserted. In some implementations, the concavity of the sidewalls of the rectangular substrate housing 310 may be 1.5 mm, or approximately $1/100^{th}$ of the height and width dimensions. In other implementations, the concavity of a concave portion of the sidewalls may be based on a gap bulk density of the compressible mat 230 when the substrate 220 is press-fit within the rectangular substrate housing 310.

To assemble the polygonal substrate assembly 300, the substrate 220 with the compressible mat 230 positioned about the substrate 220 is then pressed through a square stuffing funnel (not shown) into the rectangular substrate housing 210. Since the sidewalls of the rectangular substrate housing 210 are concave (and therefore interfere with direct insertion of the compressible mat 230 and substrate 220), the sidewalls are held straight or vertical for the substrate 220 and compressible mat 230 installation using, for example, a rollerized tube expansion plunger. The rollerized tube expansion plunger is inserted through a first end of the rectangular substrate housing 210 opposite the insertion end for the substrate 220 and compressible mat 230. As the substrate 220 and compressible mat 230 are inserted, the rollerized tube expansion plunger is removed from the first end of the rectangular substrate housing 210 as the substrate 220 and compressible mat 230 are press-fit into the opposite end. Although rectangular substrate housings are described, the implementations may be used for other polygonal substrate housings and/or assemblies, including quadrilateral, pentagonal, hexagonal, octagonal, etc. substrate housings and/or assemblies.

FIGS. 5A-5D depict another implementation of a polygonal substrate assembly 400 having a rectangular substrate housing 410, the substrate 220, and the compressible mat 230. In this implementation, the rectangular substrate housing 410 includes a main sidewall portion 412 and a substrate installation portion 416. The main sidewall portion 412 is sized to compress the compressible mat 230 against the substrate 220 to a specified gap bulk density when the compressible mat 230 and substrate 220 are inserted into the rectangular substrate housing 410. In some implementations, the main sidewall portion 412 may have a thickness of 3 mm and a width and/or height dimension of 150 mm, similar to the implementation shown in FIGS. 2-3. In other implementations, the main sidewall portion 412 may have a thickness of 1-2 mm with a concavity of 1.5 mm and a width and/or height dimension of 150 mm, similar to the implementation shown in FIG. 4.

Figure 5A:
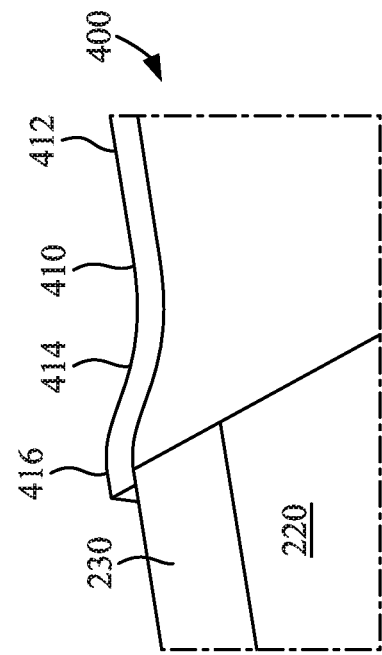
FIG. 5A is a side cross-sectional view of a rectangular substrate housing with a flared opening and showing a substrate and compressible mat.
Figure 5B:
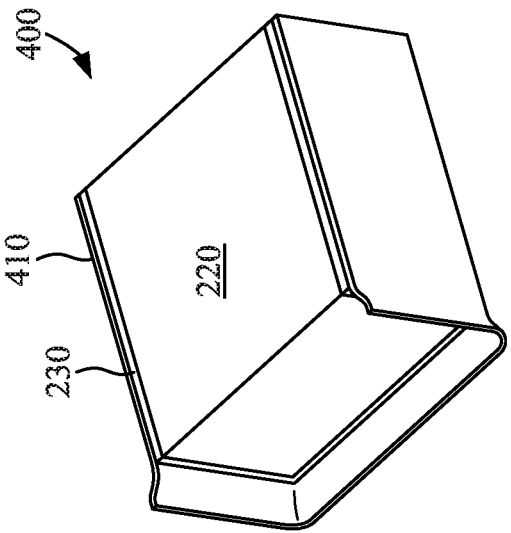
FIG. 5B is a magnified view of the flared opening of the rectangular substrate housing of FIG. 5A prior to inserting the substrate and compressible mat.
Figure 5C:
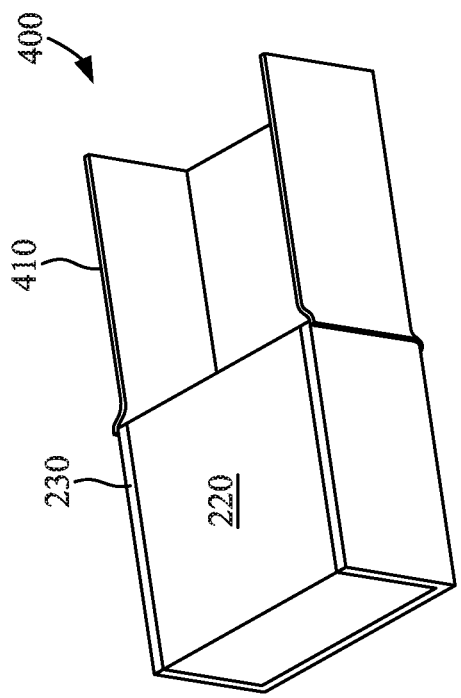
FIG. 5C is a magnified view of the flared opening of the rectangular substrate housing of FIG. 5A with the substrate and compressible mat inserted.
Figure 5D:
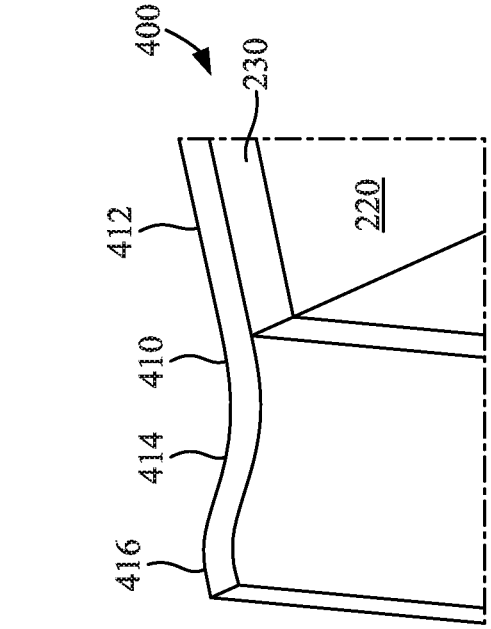
FIG. 5D is a perspective view of the rectangular substrate housing of FIG. 5A with the substrate and compressible mat inserted.

As shown in better detail in FIG. 5B, the rectangular substrate housing 410 has a transition portion 414 to flare out to the substrate installation portion 416. The substrate installation portion 416 may be sized to the uncompressed dimensions of the compressible mat 230 positioned or wrapped about the substrate 220. In other implementations, the substrate installation portion 416 may have a larger or smaller size. For instance, the substrate installation portion 416 may have a large size to connect to an upstream component of an exhaust aftertreatment system and/or to guide exhaust gas toward the substrate 220. In other instances, the substrate installation portion 416 may be sized smaller than the uncompressed compressible mat 230 and substrate 220 to reduce blocking adjacent additional rectangular substrate assemblies 400. In some implementations, the transition portion 414 may be sloped at an angle of 10 degrees, inclusive, to 80 degrees, inclusive, relative to the main sidewall of the rectangular substrate housing 410. In some implementations, the transition portion 414 may be angle at 30 degrees relative to the main sidewall of the rectangular substrate housing 410.

To install the compressible mat 230 and the substrate 220, the compressible mat 230 is positioned or wrapped about the substrate 220. The compressible mat 230 and substrate 220 are positioned adjacent to the substrate installation portion 416 of the rectangular substrate housing 410 and press-fit into the main sidewall portion 412 of the rectangular substrate housing 410. In some implementations, a square stuffing funnel (not shown) may be used to insert the compressible mat 230 and substrate 220 into the rectangular substrate housing 410. In some implementations, a square stuffing plunger with retractable tabs may be used to push the compressible mat 230 along with the substrate 220 into the rectangular substrate housing 410. When the compressible mat 230 and the substrate 220 are inserted into the rectangular substrate housing 410, the compressible mat 230 is compressed between the interior surface of the main sidewall portion 412 and corners of the rectangular substrate housing 410 and the exterior surface of the substrate 220. Thus, the compressible mat 230 is compressed to the desired gap bulk density for the rectangular substrate assembly 400 and also provides an interference fit between the rectangular substrate housing 410 and the substrate 220, thereby securing the substrate 220 within the rectangular substrate housing 410. Although rectangular substrate housings are described, the implementations may be used for other polygonal substrate housings and/or assemblies, including quadrilateral, pentagonal, hexagonal, octagonal, etc. substrate housings and/or assemblies.

FIGS. 6A-6D depict another implementation of a polygonal substrate assembly 500 having several substrate housing components 510, the substrate 220, and the compressible mat 230. In the implementation shown, the polygonal substrate assembly 500 includes four substrate housing components 510. Each substrate housing component 510 may be a right angled (i.e., 90 degrees) component that, when affixed to the other substrate housing components 510, form a rectangular or square substrate housing. In some implementations, the substrate housing components may be an acute angled component (i.e., less than 90 degrees). The substrate housing components 510 include a first end 512, a second end 514, and a corner 516. The first end 512 includes a first notch or relief 518 in the top surface and the second end 514 includes a second notch or relief 520 in the bottom surface that is complementary to the first notch or relief 518 such that, when the substrate housing component 510 is assembled with another substrate housing component 510, the thickness of the first end 512 combined with the thickness of the second end 514 is substantially the same as a desired total thickness.

Figure 6A:
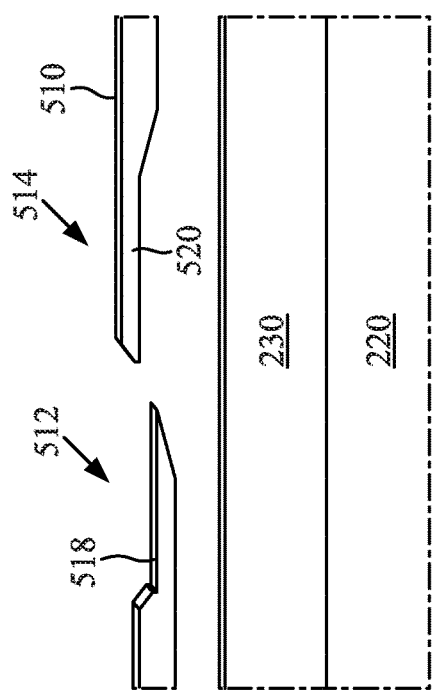
FIG. 6A is an elevation view of a disassembled rectangular substrate housing having four separate angled pieces of the rectangular substrate housing.
Figure 6B:
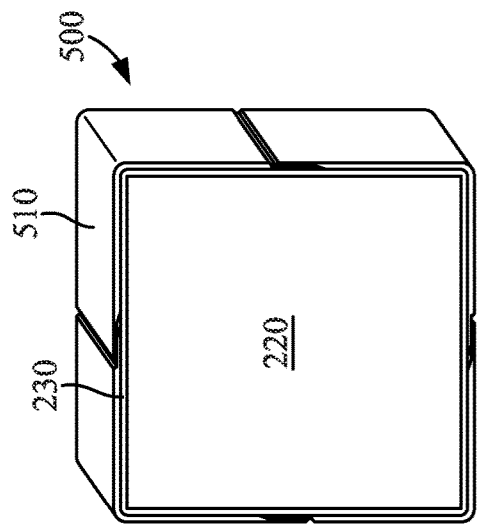
FIG. 6B is a magnified view of a joint of the disassembled rectangular substrate housing of FIG. 6A.
Figure 6C:
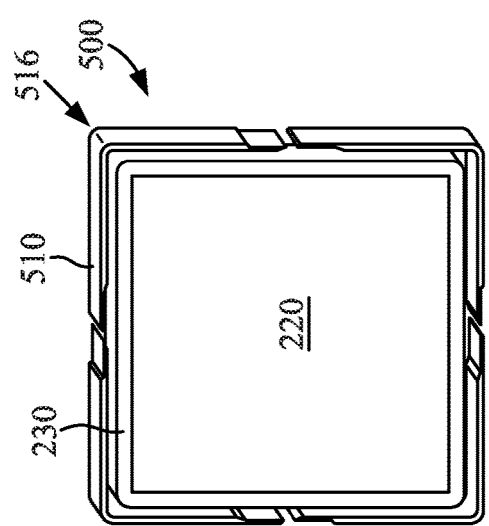
FIG. 6C is a magnified view of the assembled joint of the assembled rectangular substrate housing of FIG. 6A.
Figure 6D:
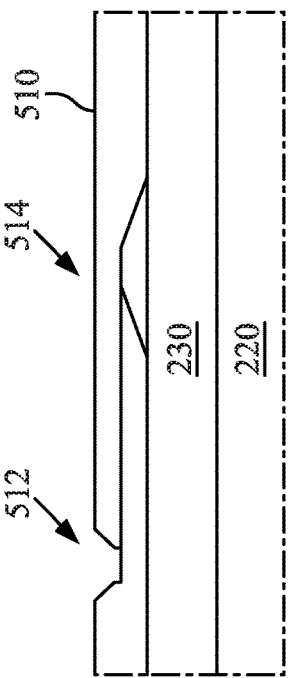
FIG. 6D is a perspective view of a assembled rectangular substrate housing of FIG. 6A.

As shown in FIG. 6A, four substrate housing components 510 are positioned about the substrate 220 and compressible mat 230. In some implementations, a jig may be used to position the substrate housing components 510 about the substrate 220 and compressible mat 230. As shown in FIG. 6B, adjacent and complementary first ends 512 and second ends 514 are aligned to be fitted together and fixedly attached together to retain the compressible mat 230 and substrate 220 within the substrate housing components 510. As shown in FIG. 6C, the complementary first ends 512 and second ends 514 are fixedly attached, such as through welding, while the substrate housing components 510 are compressed against the substrate 220 and compressible mat 230. In some implementations, the jig or another structure may equally compress each substrate housing component 510 against the substrate 220 and compressible mat 230 until a predetermined gap bulk density is achieved. The substrate housing components 510 remain in a press-fit position while fixedly attached to each other to form a completed substrate housing for the rectangular substrate assembly 500. FIG. 6D depicts the completed polygonal substrate assembly 500 with the substrate 220 and compressible mat 230 retained within the now fixedly attached substrate housing components 510. Although rectangular substrate housings are described, the implementations may be used for other polygonal substrate housings and/or assemblies, including quadrilateral, pentagonal, hexagonal, octagonal, etc. substrate housings and/or assemblies.

FIGS. 7A-7C depict still a further implementation of a polygonal substrate assembly 600 having a rectangular substrate housing 610, the substrate 220, and the compressible mat 230. In the implementation shown, the rectangular substrate housing 610 includes one or more stiffening ribs 620. As shown best in FIG. 7B, the one or more stiffening ribs 620 are positioned proximate an end of the rectangular substrate housing 610, though the one or more stiffening ribs 620 may be positioned at other areas of the rectangular substrate housing 610. The one or more stiffening ribs 620 include a sloped inner portion 622 and a ridged outer portion 624. The sloped inner portion 622 is positioned to be opposite the end to which the one or more stiffening ribs 620 is proximate. The sloped inner portion 622 is angled relative to the main sidewall of the rectangular substrate housing 610 such that the compressible mat 230 does not catch or bunch when inserted into the rectangular substrate housing 610. In some implementations, the sloped inner portion 622 may be sloped at an angle of 10 degrees, inclusive, to 80 degrees, inclusive, relative to the main sidewall of the rectangular substrate housing 610. In some implementations, the sloped inner portion 622 may be angle at 30 degrees relative to the main sidewall of the rectangular substrate housing 610. The ridged outer portion 624 is an at or near vertical portion that provides rigidity to the rectangular substrate housing 610. In some implementations, the ridged outer portion 624 may be 1 centimeter of less from the end of the rectangular substrate housing 610. In other implementations, the ridged outer portion may be less than or more than 1 centimeter from the end of the rectangular substrate housing 610. In some implementations, the usage of the one or more stiffening ribs 620 may permit a thinner sidewall thickness to be used for the rectangular substrate housing 610, such as a sidewall thickness of 1-2 mm.

When the compressible mat 230 and substrate 220 are inserted into the rectangular substrate housing 610, the compressible mat 230 and substrate 220 are inserted through an end of the rectangular substrate housing 610 and press-fit into the rectangular substrate housing 610. In some implementations, the compressible mat 230 and substrate 220 are pressed through a square stuffing funnel (not shown) into the rectangular substrate housing 610. As the compressible mat 230 and the substrate 220 are inserted, the sloped inner portion 622 assists the compressible mat 230 to be inserted past the one or more stiffening ribs 620 to avoid catching or bunching of the compressible mat 230. Although rectangular substrate housings are described, the implementations may be used for other polygonal substrate housings and/or assemblies, including quadrilateral, pentagonal, hexagonal, octagonal, etc. substrate housings and/or assemblies.

Figure 8B:
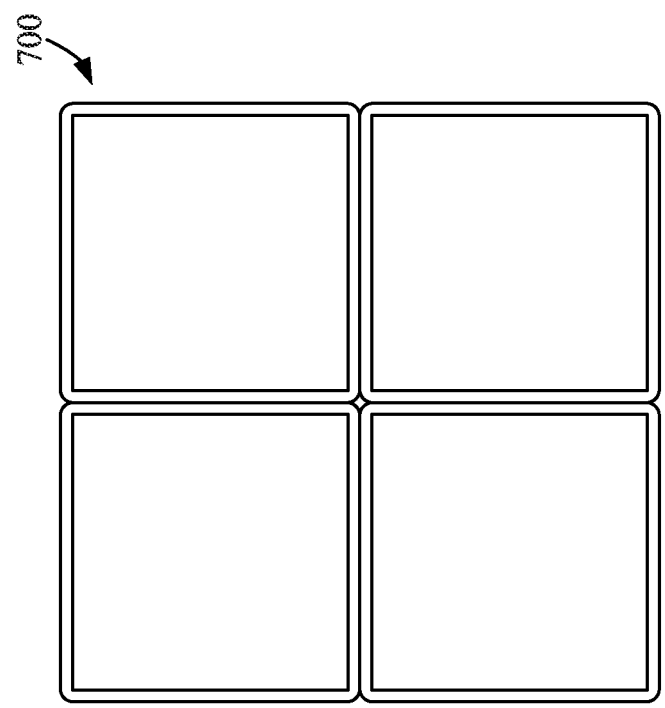
FIG. 8B is a front elevation view of the several rectangular substrate housings assembled into a square substrate assembly.
Figure 8A:
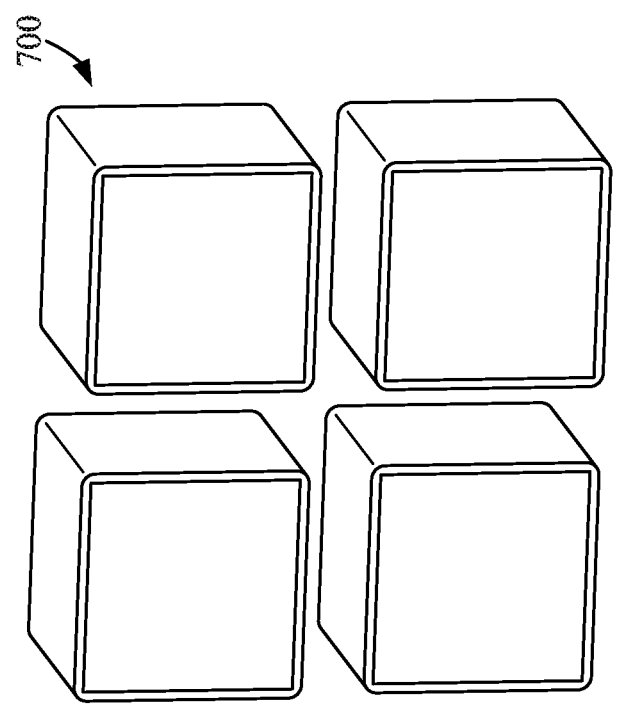
FIG. 8A is a perspective view of several rectangular substrate housings prior to assembly.

FIG. 8A-8B depicts an implementation of an array 700 of several polygonal substrate assemblies 200, 300, 400, 500, 600 that can be assembled together. Any of the polygonal substrate assemblies 200, 300, 400, 500, 600 may be used for the array 700. In the implementation shown, the polygonal substrate assemblies 200, 300, 400, 500, 600 are assembled together to form a larger square array 700, though other configurations may be used as well, such as a rectangular array, a T-shaped array, etc. The rectangular substrate housing of the polygonal substrate assemblies 200, 300, 400, 500, 600 can be attached and/or otherwise secured to each other to form the array 700. For instance, the polygonal substrate assemblies 200, 300, 400, 500, 600 can be welded together, bolted, screwed, latched, belted, strapped, etc. Although rectangular substrate housings of the polygonal substrate assemblies 200, 300, 400, 500, 600 are described, the implementations may be used for other polygonal substrate housings and/or assemblies, including quadrilateral, pentagonal, hexagonal, octagonal, etc. substrate housings and/or assemblies. In some implementations, multiple different shaped polygonal substrate assemblies 200, 300, 400, 500, 600 may be combined together to form the array 700, such as octagonal substrate assemblies with square substrate assemblies.

Figure 10:
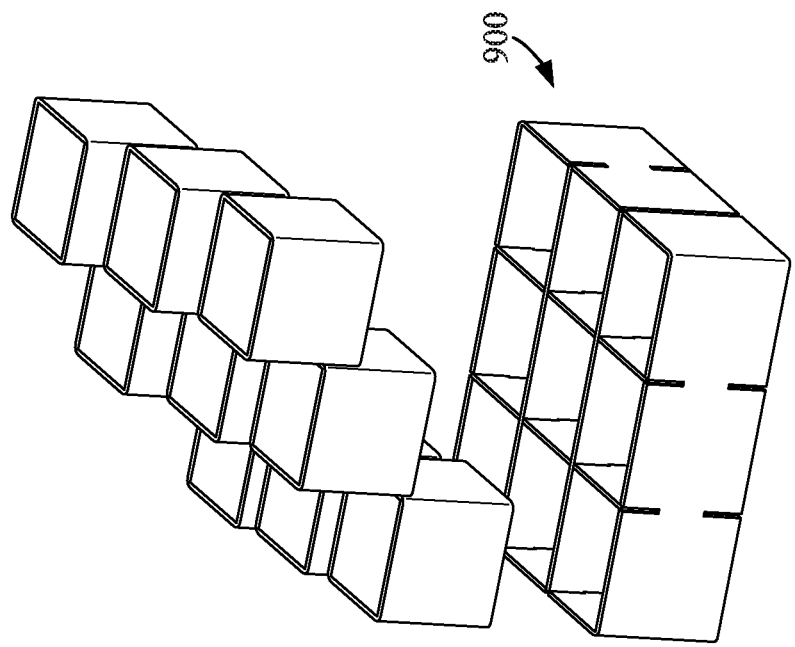
FIG. 10 is a perspective view showing the canning assembly of FIG. 9 with rectangular substrates shown separate from the assembly.
Figure 9:
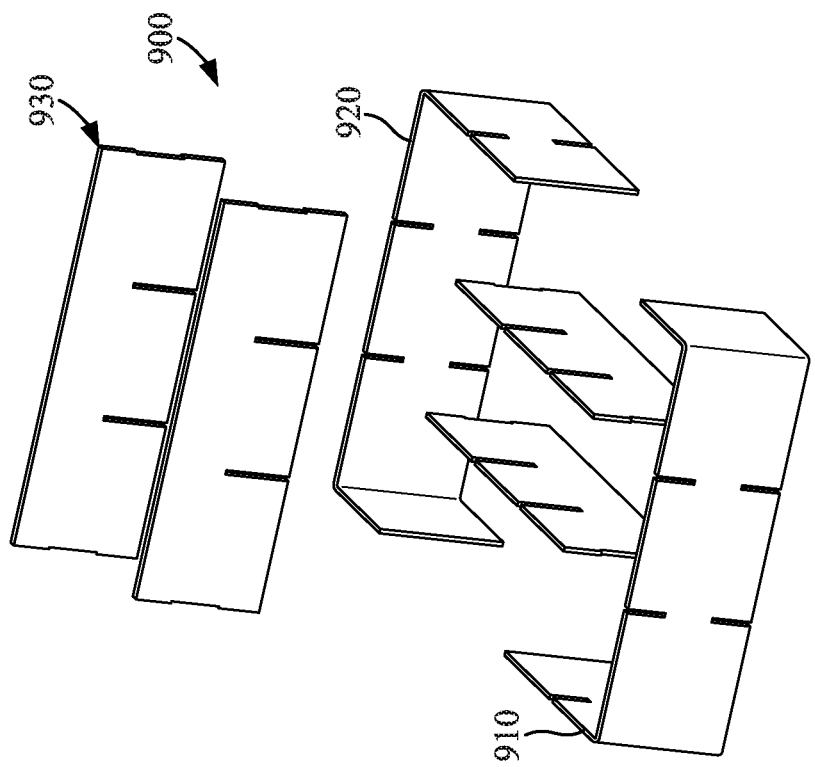
FIG. 9 is an exploded view of a canning assembly.
Figure 11:
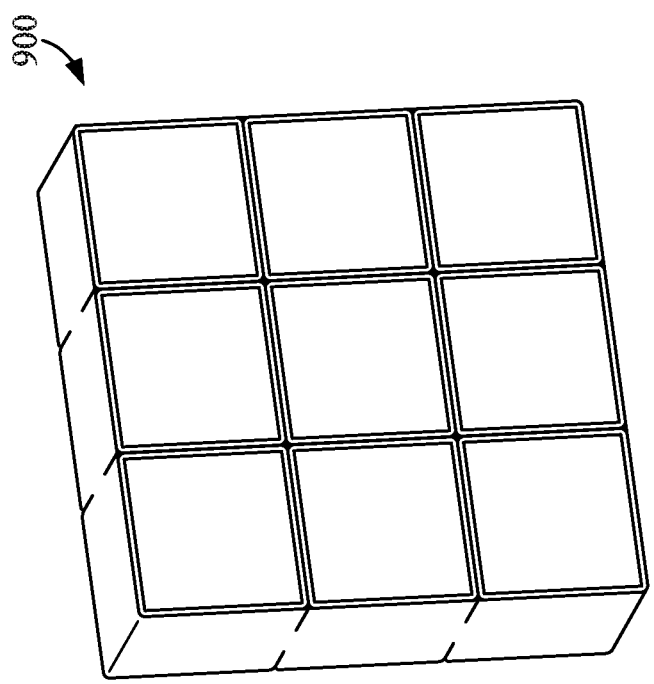
FIG. 11 is a perspective view showing the canning assembly of FIG. 9 with the rectangular substrates inserted.

FIG. 9 depicts a canning assembly 900 having end caps 910, 920 and interior partitions 930. The canning assembly 900 is configured to retain one or more polygonal substrate assemblies 200, 300, 400, 500, 600 therein. The end caps 910, 920 are made of thick sheet metal to retain the polygonal substrate assemblies 200, 300, 400, 500, 600 within the canning assembly 900. The interior partitions 930 may be made of thinner sheet metal. The interior partitions 930 include one or more notches to assemble the interior partitions together into a grid pattern. Each grid is sized to receive a polygonal substrate assembly 200, 300, 400, 500, 600 and/or a polygonal substrate and compressible mat. The end caps 910, 920 are connected together, such as by welding, to form a grid for a plurality of polygonal substrates. As shown in FIG. 10, a plurality of polygonal substrate assemblies 200, 300, 400, 500, 600 and/or polygonal catalyst substrates and compressible mats can be arranged to be inserted into the canning assembly 900. FIG. 11 depicts the plurality of polygonal substrate assemblies 200, 300, 400, 500, 600 and/or polygonal catalyst substrates and compressible mats inserted into the canning assembly 900.

Figure 12:
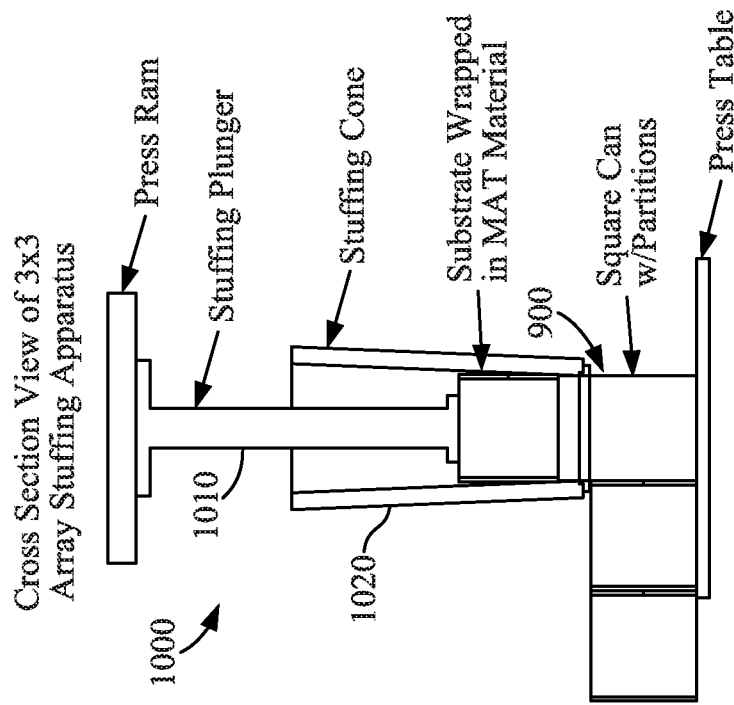
FIG. 12 is a side cross-sectional view of a canning stuffing assembly.

FIG. 12 depicts a canning stuffing assembly 1000 for stuffing one or more polygonal catalyst substrates and compressible mats into a canning assembly, such as the canning assembly 900. The canning stuffing assembly 1000 includes a stuffing plunger 1010 and a stuffing cone 1020. The stuffing plunger 1010 can be a rigid tubular or solid member with a first plunger end and a second plunger end such that the first plunger end is arranged proximate or abutting a side of a polygonal catalyst and compressible mat and the second plunger end is coupled to and/or aligned with a source of force. The stuffing cone 1020 is sized and configured to receive an uncompressed polygonal catalyst and compressible mat and to evenly compress the polygonal catalyst and compressible mat to a compressed dimension as the polygonal catalyst and compressible mat is plunged through the stuffing cone 1020 by the stuffing plunger 1010. The stuffing cone 1020 can include alignment features, such as notches, to align with one or more features of a canning assembly.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the implementations described above should not be understood as requiring such separation in all implementations, and it should be understood that the described components and systems can generally be integrated in a single product or packaged into multiple products embodied on tangible media.

As utilized herein, the terms "approximately," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
   a polygonal substrate housing, the polygonal substrate housing comprising:
   a main sidewall comprising a first portion, a second portion, and a third portion, the second portion located at an overall end of the polygonal substrate housing,
   a first stiffening rib projecting outwardly from the main sidewall, the first stiffening rib comprising:
   a first sloped portion contiguous with the first portion and outwardly tapered in a direction from the first portion toward the second portion,
   a first straight portion contiguous with the second portion and projecting outwardly from the second portion, and
   a first ridged outer portion contiguous with the first sloped portion and the first straight portion,
   a substrate installation portion, and
   a second stiffening rib projecting outwardly from the main sidewall, the second stiffening rib comprising:
   a second sloped portion contiguous with the third portion and outwardly tapered in a direction from the third portion toward the first portion,
   a second straight portion contiguous with the first portion and projecting outwardly from the first portion, and
   a second ridged outer portion contiguous with the second sloped portion and the second straight portion;

a substrate; and a compressible mat, the compressible mat positioned about the substrate, the substrate press-fit within the polygonal substrate housing with the compressible mat;

wherein the second portion extends between the first stiffening rib and the substrate installation portion;

wherein the first portion extends between the first stiffening rib and the second stiffening rib; and wherein the first ridged outer portion is separated from the compressible mat and the second ridged outer portion is separated from the compressible mat.

2. The apparatus of claim 1, wherein the polygonal substrate housing is a rectangular substrate housing.

3. The apparatus of claim 2, wherein the main sidewall has a concave portion.

4. The apparatus of claim 3, wherein a concavity of the concave portion is based on a gap bulk density for the compressible mat when the substrate is press-fit within the rectangular substrate housing.

5. The apparatus of claim 1, wherein the substrate installation portion has an opening sized to a size of the compressible mat positioned about the substrate with the compressible mat uncompressed.

6. The apparatus of claim 2, wherein the rectangular substrate housing comprises a plurality of substrate housing components, each of the plurality of substrate housing components having a first end with a first notch and a second end with a second notch, the rectangular substrate housing formed by fixedly coupling each first notch to a corresponding second notch of the plurality of substrate housing components.

7. The apparatus of claim 1, wherein the polygonal substrate housing is one of a quadrilateral substrate housing, a pentagonal substrate housing, a hexagonal substrate housing, a heptagonal substrate housing, an octagonal substrate housing, a nonagonal substrate housing, or decagonal substrate housing.

8. An assembly comprising:

a plurality of polygonal substrate assemblies, each of the plurality of polygonal substrate assemblies comprising:

a polygonal substrate housing, the polygonal substrate housing comprising a main sidewall including a first portion, a second portion located at an overall end of the polygonal substrate housing, a third portion, a first stiffening rib projecting outwardly from the main sidewall and including a first sloped portion contiguous with the first portion and outwardly tapered in a direction from the first portion toward the second portion, a first straight portion contiguous with the second portion and projecting outwardly from the second portion, and a first ridged outer portion contiguous with the first sloped portion and the first straight portion, a substrate installation portion, and a second stiffening rib projecting outwardly from the main sidewall and including a second sloped portion contiguous with the third portion and outwardly tapered in a direction from the third portion toward the first portion, a second straight portion contiguous with the first portion and projecting outwardly from the first portion, and a second ridged outer portion contiguous with the second sloped portion and the second straight portion, where the second portion extends between the first stiffening rib and the substrate installation portion, and where the first portion extends between the first stiffening rib and the second stiffening rib;

a substrate; and a compressible mat, the compressible mat positioned about the substrate, the substrate press-fit within the polygonal substrate housing with the compressible mat such that the first ridged outer portion is separated from the compressible mat and the second ridged outer portion is separated from the compressible mat;

wherein the plurality of polygonal substrate assemblies are coupled together to form an array.

9. The assembly of claim 8, wherein the polygonal substrate housing is a rectangular substrate housing.

10. The assembly of claim 9, wherein the main sidewall has a concave portion.

11. The assembly of claim 10, wherein a concavity of the concave portion is based on a gap bulk density for the compressible mat when the substrate is press-fit within the rectangular substrate housing.

12. The assembly of claim 8, wherein the substrate installation portion has an opening sized to a size of the compressible mat positioned about the substrate with the compressible mat uncompressed.

13. The assembly of claim 9, wherein the rectangular substrate housing comprises a plurality of substrate housing components, each of the plurality of substrate housing components having a first end with a first notch and a second end with a second notch, the rectangular substrate housing formed by fixedly coupling each first notch to a corresponding second notch of the plurality of substrate housing components.

14. The assembly of claim 8, wherein the polygonal substrate housing is one of a quadrilateral substrate housing, a pentagonal substrate housing, a hexagonal substrate housing, a heptagonal substrate housing, an octagonal substrate housing, a nonagonal substrate housing, or decagonal substrate housing.

15. An assembly comprising:

a canning assembly forming a polygonal arrangement; and a plurality of substrate assemblies comprising:

a substrate housing comprising a main sidewall including a first portion, a second portion located at an overall end of the substrate housing, a third portion, a first stiffening rib projecting outwardly from the main sidewall and including a first sloped portion contiguous with the first portion and outwardly tapered in a direction from the first portion toward the second portion, a first straight portion contiguous with the second portion and projecting outwardly from the second portion, and a first ridged outer portion contiguous with the first sloped portion and the first straight portion, a substrate installation portion, and a second stiffening rib projecting outwardly from the main sidewall and including a second sloped portion contiguous with the third portion and outwardly tapered in a direction from the third portion toward the first portion, a second straight portion contiguous with the first portion and projecting outwardly from the first portion, and a second ridged outer portion contiguous with the second sloped portion and the second straight portion, where the second portion extends between the first stiffening rib and the substrate installation portion, and where the first portion extends between the first stiffening rib and the second stiffening rib;

a substrate; and a compressible mat, the compressible mat positioned about the substrate, the compressible mat press-fit within the substrate housing with the substrate such that the first ridged outer portion is separated from the compressible mat and the second ridged outer portion is separated from the compressible mat;

wherein the plurality of substrate assemblies are press-fit within the canning assembly.

16. The assembly of claim 15, wherein the canning assembly includes a first end cap, a second end cap, and a plurality of interior partitions.

17. The assembly of claim 16, wherein a thickness of an interior partition of the plurality of interior partitions is less than a thickness of one of the first end cap or the second end cap.

18. The assembly of claim 17, wherein the polygonal arrangement is a rectangular grid arrangement.

19. The apparatus of claim 1, wherein the substrate installation portion flares out from the second portion at the overall end.

\* \* \* \* \*